United States Patent

[11] 3,603,559

| [72] | Inventor | Gilbert P. Totten |
| | | Minneapolis, Minn. |
| [21] | Appl. No. | 799,187 |
| [22] | Filed | Feb. 14, 1969 |
| [45] | Patented | Sept. 7, 1971 |
| [73] | Assignee | The Cornelius Company |
| | | Onoka, Minn. |

[54] SOLENOID-ACTUATED VALVE MECHANISM WITH LEVER-TYPE OPERATING MEANS
9 Claims, 6 Drawing Figs.

[52] U.S. Cl. ...................................................... 251/138
[51] Int. Cl. ...................................................... F16k 31/10
[50] Field of Search ........................................... 251/138, 290, 143; 137/270

[56] References Cited
UNITED STATES PATENTS

| 1,680,245 | 8/1928 | Penn ............................ | 251/138 |
| 1,767,738 | 6/1930 | Brown .......................... | 251/138 X |
| 1,790,705 | 2/1931 | Heywood ...................... | 251/290 X |
| 2,570,450 | 10/1951 | Hottenroth .................... | 251/138 |
| 2,600,618 | 6/1952 | Cobb et al. ................... | 251/138 X |
| 2,630,827 | 3/1953 | Miller ............................ | 251/138 X |
| 3,080,889 | 3/1963 | Noakes ......................... | 137/270 X |
| 3,302,912 | 2/1967 | Hurlburt, Jr. .................. | 251/143 X |

*Primary Examiner*—Arnold Rosenthal
*Attorney*—Wicks & Nemer

ABSTRACT: A plunger-type valve mechanism in which a lever operating the valve plunger is actuated by a solenoid and in which the fulcrum of the lever is adjustable to vary the maximum opening of the valve.

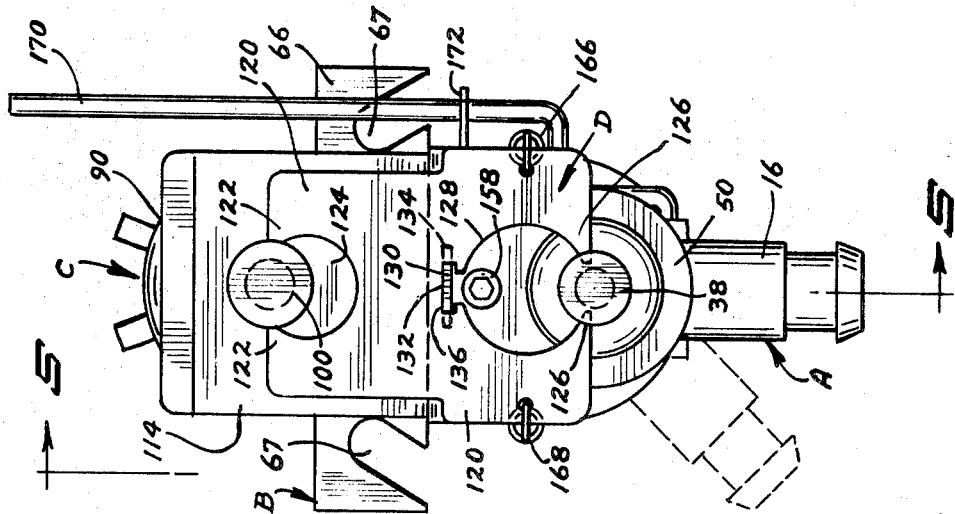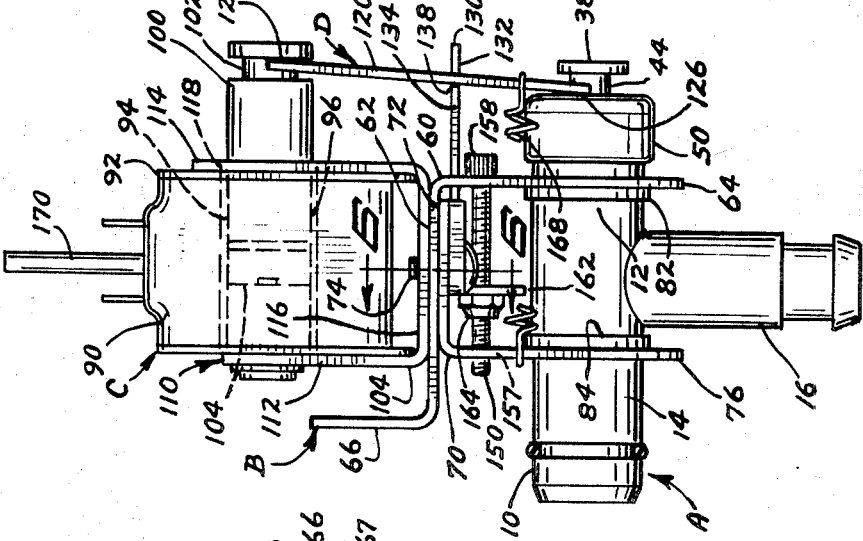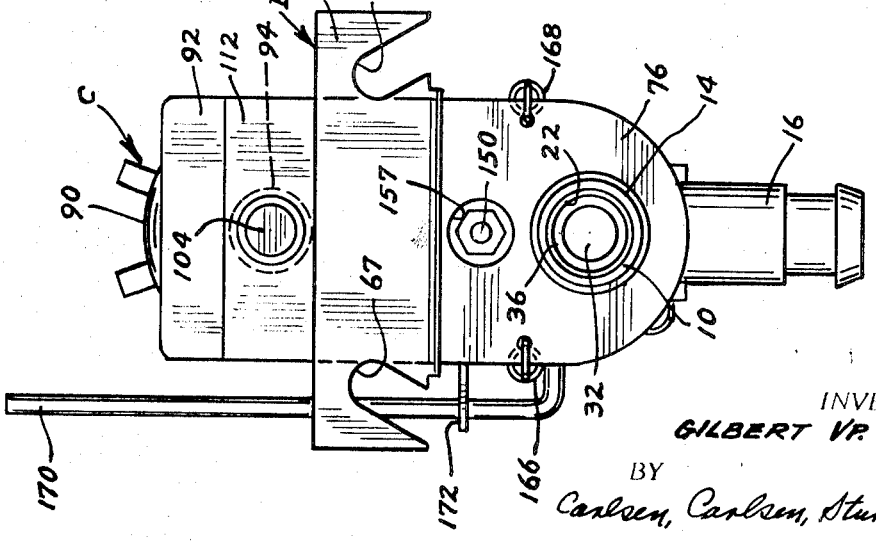

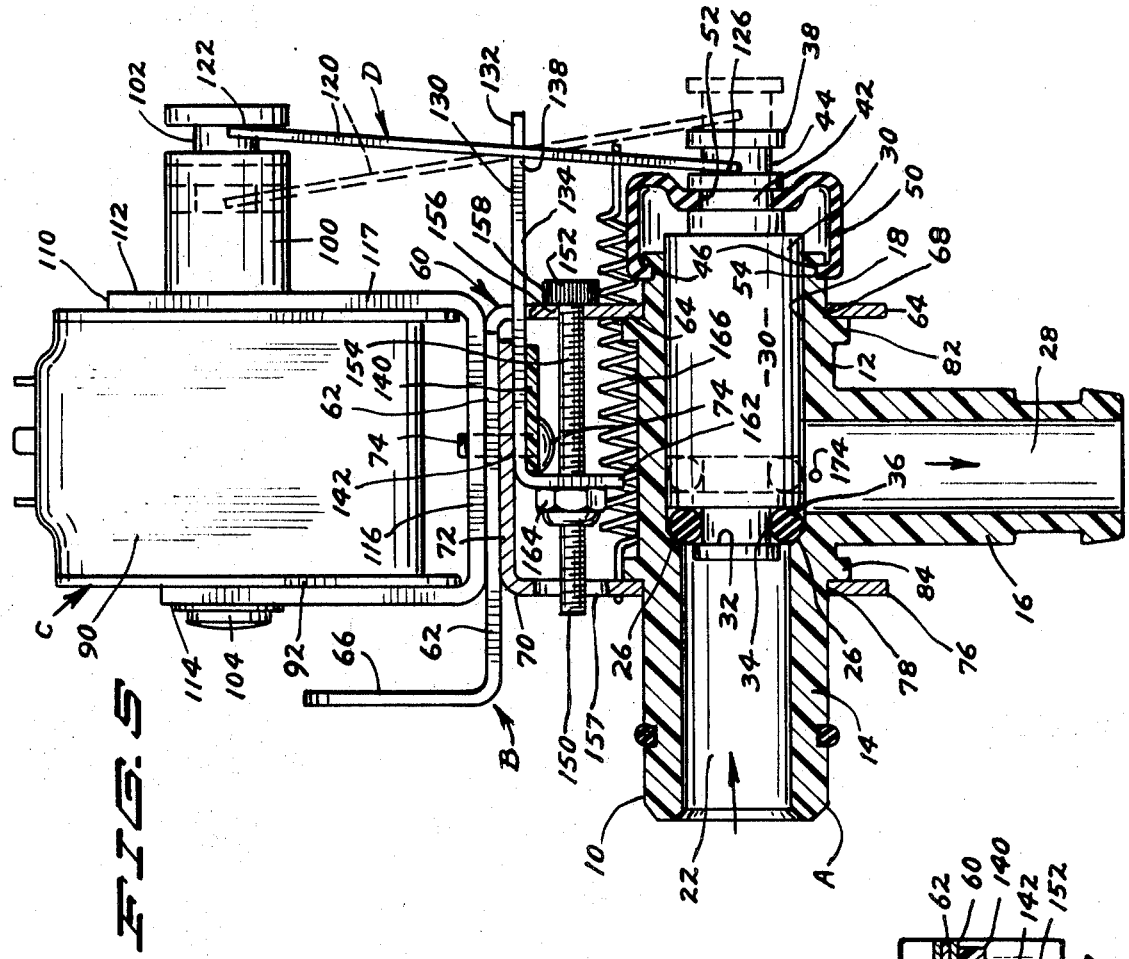
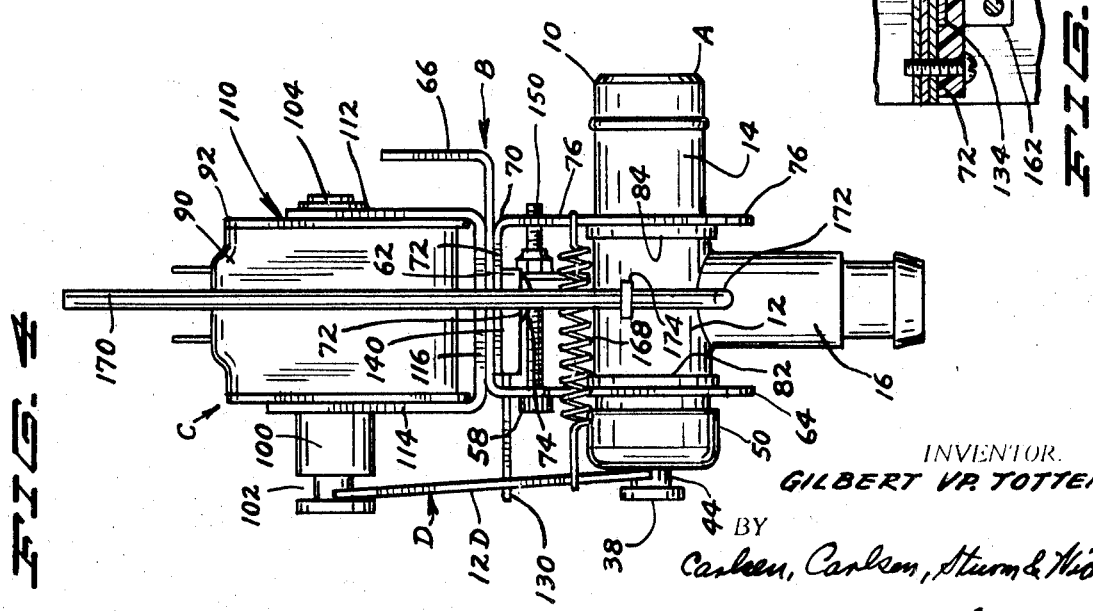

SOLENOID-ACTUATED VALVE MECHANISM WITH LEVER-TYPE OPERATING MEANS

SUMMARY OF THE INVENTION

It is an object of the invention to provide a valve mechanism having a valve head in which a valve plunger is carried but without any springs or other moving parts within the valve chamber. In a valve having springs in the chamber, the springs easily bring malfunction. The disclosed has new and novel means for limiting the opening of the valve controlled by adjusting means. The valve housing is so mounted that it can be rotated to direct the inlet in numerous different lateral directions, and the mounting allows the valve housing to be made of the most desirable plastic but without the need of screws for engagement with the body which tends to distort or fracture the plastic.

The construction disclosed allows the plunger to be operated either electrically or manually. It is a further object to provide a valve having a plunger which may be removed from the valve housing without the sue of tools to permit the cleaning of the housing and valve seat or replacement and without interfering with the adjustment of the adjustment means. Such removal of the plunger may be done while the valve mechanism is mounted in operative position. The entire valve may be easily and quickly disassembled by means of a screw driver or equivalent tool. Easy access for cleaning of the valve seat plunger bore is desirable due to the rapid accumulation of lime and other deposits found in water upon the valve seat.

These and other more detailed and specific objects will be disclosed in the course of the following specification, reference being had to the accompanying drawings, in which:

FIG. 1 is a front elevational view of a valve mechanism illustrating an embodiment of the invention;

FIG. 2 is a left side elevational view of the structure shown in FIG. 1;

FIG. 3 is a rear elevational view of the valve mechanism;

FIG. 4 is a view similar to FIG. 2 viewed from the right side of the valve mechanism;

FIG. 5 is a part-sectional view taken on line %—5 of FIG. 1 and drawn to a greater scale; and FIG. 6 is a fragmentary sectional view taken on line 6—6 of FIG. 2.

The invention comprises a valve A mounted on supporting means B. Also mounted on said supporting means is electromagnetic means C. Operating means D acts between the electromagnetic means C and the valve A and serves to open said valve when the electromagnetic means is energized.

The valve A comprises a body 10 which is constructed of some heat-resisting plastic material suitable for the purpose for which the valve is to be used. The body 10 is T-shaped in form having three branches 12, 14 and 16 of which the branches 12 and 14 are in alignment and the branch 16 issues outwardly from the branch 12. The branch 12 is formed with a cylindrical bore 18 which is open to the exterior at the outer end thereof and which serves as a valve chamber. The branch 14 serves as the inlet of the valve and has a cylindrical inlet passageway 22 coaxial with the bore 18 and communicating therewith. The diameter of the passageway 22 is less than the diameter of the bore 18, and formed at the juncture of the two passageways is a conical valve seat 26. The branch 16 of the body 10 serves as an outlet and has an outlet passageway 28 open to the exterior and communicating with the valve chamber 18 beyond the valve seat 26.

In the bore 18 of body 10 is slidably mounted a valve plunger 30. This plunger has at its inner end a reduced portion 32 which is formed with an annular groove 34. In this groove is mounted an O-ring 36 which serves as a valve seat-engaging member and which is adapted to seat against the valve seat 26 and prevent flow from the valve chamber 22 and into the outlet passageway 28. The outer end of the plunger 30 has an extension 38 which is formed with an inner annular groove 42 and an outer annular groove 44. The plunger 30 is long enough so that both the grooves 42 and 44 lie outwardly of the outer end of the branch 12 of body 10 when the valve is closed. In the outer surface of the outer end of branch 12 is formed an annular groove 46. Encircling the outer ends of the plunger 30 and branch 12 is a flexible seal 50 in the form of a sleeve and which has an annular bead 52 received in groove 42 and an annular bead 54 received in groove 46. The seal 50 is constructed of elastic material and closes the space between the plunger 30 and branch 12 of body 10, allowing the plunger 30 to move outwardly and open the valve by unseating the valve seat-engaging member 36 from the valve seat 26.

The supporting means B comprises an upper part 60 formed from a strip of sheet metal bent to provide a web 62 with a support flange 64 extending downwardly from the outer end thereof and a bracket 66 extending upwardly from the inner end thereof. The bracket 66 has openings 67 in the same and through which fasteners not shown may extend to hold the valve mechanism attached to any suitable object where it is to be used. The supporting means in addition includes a lower part 70 which has a web 72 underlying the web 62 and secured thereto by means of screws 74 as will be presently and more fully described. The web 72 has issuing from the inner edge thereof a support flange 76 which lies inwardly of and spaced from the flange 64 and which is parallel thereto. The support flanges 64 and 76 have holes 68 and 78 formed therein which receive the branches 12 and 14 of the body 10 and butt up against annular shoulders 82 and 84 formed on said branches. By this means the body 10 is rotatably clamped and supported in position on the support flanges 64 and 76 without the use of screws screwed into the body 10 or similar fastening means attached to the body.

The electromagnetic means C comprises a solenoid coil 90 which is wound on a spool 92. This spool has a cylindrical hub 94 formed with a bore 96 therein (FIG. 2). Slidable in the bore of said spool is an electromagnet 100 which has an annular groove 102 at its outer end and which is limited in inward movement by a plug 104 inserted in the lower end of the hub 94 and secured thereto. The solenoid 90 is supported by means of a U-shaped frame 110 having spaced flanges 112 and 114 with a connecting portion 116 therebetween. The flange 112 has a hole 118 in it and through which the electromagnet 100 extends. The stop 104 is attached to the flange 112. The connecting portion 116 is tapped to receive the screws 74 whereby the electromagnetic means is supported on the supporting means B.

The operating means D comprises a lever 120 which is stamped from sheet metal and is mounted for swinging movement on a fulcrum 130. This lever has spaced facing fingers 122 at one end which are received in the groove 102 in electromagnet 100. The metal of the lever 120 inwardly of these fingers is removed to form an opening 124 eliminating interference between the electromagnet and lever at localities other than at said fingers. Lever 120 is also provided at its other end with spaced fingers 126 which are received in the groove 44 in the extension 38 on plunger 30. This portion of the lever is formed with an opening 128 which serves the same purpose as opening 124.

The lever 120 is mounted for swinging movement on a fulcrum 130 attached to the supporting means B. This fulcrum has a shank 134 and a narrowed portion as tongue 132 issuing outwardly therefrom and which extends through a slot 136 in the lever 120. This tongue 132 is narrower than said shank to provide shoulders 138 adjacent said tongue which engage the inside of the lever 120 and support it for swinging movement. The shank 134 of fulcrum 130 lies in a groove 142 formed in a block 140, which is clamped against the web 72 of the upper part 60 of supporting means B by means of the screws 74 previously referred to, the connecting portion 116 of frame 110 being tapped to receive said screws as previously described.

The position of the fulcrum 130 may be adjusted by an adjusting means 150 which comprises a screw 152 having a threaded shank 154 extending through a hole 156 in the flange 64 of the upper part 60 of supporting means B. This screw also has a head 158 having a socket for an Allen wrench 158. The shank 154 passes through a lug 162 bent downwardly from the lower end of the shank 134 of fulcrum 130 and is screwed into a nut 164 secured to the under side of said lug. The shank 154 is also adapted to extend through a hole 157 in the flange 76.

Acting between the lever 120 and the flange 76 of the upper part 60 of supporting means B are two tension coil springs 166 and 168, one connected in holes at each side edge of said lever and flange. These springs are disposed between the fulcrum 130 and the fingers 122 of lever 120 and serve to hold the valve seat engaging member 36 in engagement with the valve seat 26 to hold the valve closed.

For the purpose of draining the outlet passageway 28 and particularly when a tube is connected to the outlet 16, a small tube 170 is employed which is connected at the lower end to the discharge branch 16 at hole 172, located below the plunger 36, FIG. 4. This tube is further mounted on the body 10 by fastening bracket 174. The bracket 174 is formed with a hole extending therethrough and through which the tube 170 extends. The racket 172 is secured by means of the screw 74 extending through a hole in the bracket. The tube 170 allows air to enter passageway 28 to completely drain the liquid therein.

The operation of the valve structure is as follows. Branch 16 of the valve body serves as a discharge spout and branch 14 serves as an inlet which is connected to a source of the liquid to be dispensed. The solenoid 90 is connected to source of electricity, and when the switch in the solenoid circuit is closed, electromagnet 100 is drawn into the hub 68 and toward the stop 104. This action swings the lever 120 counterclockwise as viewed in FIG. 5 and moves the plunger 30 toward the right thereby moving the valve seat-engaging member 36 off of the valve seat 26 allowing the liquid to flow from inlet passageway 22 into valve chamber 18 to be discharged therefrom through discharge passageway 28. The same result can be procured by manually pressing on the exposed end of the electromagnet 100 or the upper portion of lever 120. Upon release of the electromagnet or by deenergizing the solenoid 90, springs 166 and 168 return the parts to normal position. By adjusting the screw 152 the fulcrum point at 138 may be changed and the rate of flow of the liquid through the valve may be regulated.

To clean the valve or replace worn parts the springs 166 and 168 are removed. Lever 120 is then swung outwardly, drawing electromagnetic 100 out of the hub 94 and permitting the fingers 122 to be drawn out of the groove 102 and freeing the electromagnet. Upon further swinging of the lever 120 the same will clear the tongue 132 of fulcrum 130 and the fingers 126 can be withdrawn from the groove 44 in plunger 30. Seal 50 can now be removed and the plunger removed from bore 18 of body 10. Cleaning of the bore and the valve seat may now be readily accomplished.

The advantages of the invention are manifest. The valve mechanism is extremely simple in construction and can be manufactured at a very reasonable cost. The springs being on the exterior of the valve body can be easily removed and replaced to permit removal of the parts and of cleaning and replacing worn parts. There being two springs, one of each side of the lever, uniform pressure is applied to the valve seat-engaging member throughout its extent thereby producing uniform wear and greater life.

The valve chamber being cylindrical and the plunger filling the same, the plunger on movement removes sediment and cleans the bore. The liquid has a direct path through the valve. The supporting means being made in two parts, the valve body can e secured to the same without the use of screws screwed into the body. The use of a lever acting between the electromagnetic means and the valve provides a simple construction external of the valve for varying the rate of flow of the liquid. The valve body can be constructed of plastic material to reduce heat loss.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A valve mechanism comprising
   a. valve having
   b. a valve body formed with
   c. a valve chamber having an opening extending through said body,
   d. an inlet having a passageway communicating with said valve chamber,
   e. an outlet having a passageway communicating with said valve chamber,
   f. a valve seat encircling one of said passageways,
   g. a valve seat engaging means in the valve chamber disposed at the end of a plunger slidable toward and from the valve seat
   h. supporting means for the valve body,
   i. electromagnetic means carried by the supporting means, having
   j. a coil,
   k. an elongated cylindrical electromagnetic core slidable within the coil in a direction substantially parallel to the axis of said plunger and in the opposite direction upon energization of the coil,
   l. stop means for limiting the movement of the core
   m. the plunger has an annular groove at its outer end, and the core is cylindrical and has an annular groove at its outer end
   n. a lever pivoted intermediate its ends to a fulcrum attached to said supporting means,
   o. said lever has spaced fingers at one end received in the groove in the plunger and engageable with the shoulders formed by said groove and
   p. the lever has spaced fingers at the other end received in the groove on the core and engageable with the shoulders on the core formed by said groove.

2. A valve mechanism according to claim 1 in which the fulcrum is formed with
   a. a shank having
   b. a reduced tongue extending outwardly therefrom to form
   c. shoulders on each side thereof,
   d. said lever having an aperture receiving said reduced tongue and pivoted on said shoulders and
   e. resilient means acting between said lever and supporting means and urging said lever against said shoulders on said fulcrum and said valve seat-engaging member against said valve seat.

3. A valve mechanism according to claim 2 in which the resilient means includes two coil springs engaging the lever at localities lying between the fulcrum and the plunger and outwardly of a plane containing the axes of the plunger and core and on each side thereof.

4. A valve mechanism according to claim 1 in which:
   a. the fulcrum is in the form of an elongated shank, one end thereof engaging the lever intermediate its ends and
   h. guide means carried by the supporting means and guiding said shank for sliding movement in a direction substantially parallel to the movement of the valve engaging member.

5. A valve mechanism according to claim 4 in which:
   a. the shank at its end remote from the lever has a lug issuing downwardly therefrom,
   b. the supporting means has a flange overlying said lug and disposed between said lug and the lever,
   c. said lug having threads and
   d. a screw screwed into said threads and having
   e. a part rotatable relative to the first-named flange and held from axial movement relative to said first-named flange in a direction toward said lug.

6. A valve mechanism comprising
   a valve having a valve body formed with
c. a valve chamber having an opening extending through said body,
d. an inlet having a passageway communicating with said valve chamber,
e. an outlet having a passageway communicating with said valve chamber,
f. a valve seat encircling one of said passageways,
g. valve seat-engaging means in said valve chamber movable in a certain direction into and out of engagement with said valve seat
h. supporting means for said valve body
i. electromagnetic means carried by said supporting means and having
j. a coil and
k. a movable member spaced from the valve seat-engaging member and movable in a direction substantially parallel to the direction of movement of said valve seat-engaging member
l. operating means including
m. a fulcrum between said members in the form of an elongated shank,
n. a lever pivoted at its ends to said members and to said fulcrum at one end of said shank, and serving to move said valve seat-engaging member out of engagement with said valve seat upon energization of said coil,
o. the valve seat-engaging means being mounted on a cylindrical plunger slidable in a bore in said body forming the valve chamber and providing the opening to the exterior of the body,
p. said plunger having an extension extending outwardly therefrom and
q. formed with an annular groove,
r. said lever has means entering said groove and moving said plunger and seat engaging means into and out of engagement with said seat.

7. A valve mechanism according to claim 6 in which:
a. the valve body has a tubular branch through which the plunger extends,
b. said plunger having an annular groove disposed outwardly of said tubular branch,
c. said branch having an annular groove near the end thereof and
d. an elastic tubular seal encircling said plunger and branch and having g
e. beads at its ends received in said grooves.

8. A valve comprising:
a. a valve body having
b. first and second substantially aligning branches,
c. a third branch extending laterally from said first branch,
d. said first branch having a shoulder facing outwardly in one direction,
e. said second branch having a shoulder facing outwardly in the opposite direction,
f. supporting means for the valve body comprising
g. a first part having,
h. a web,
i. a flange extending outwardly from one end of said web and engaging the first shoulder of said body and
j. a bracket extending outwardly from the end of said web,
k. said supporting means further including
l. a second part having,
m. a web overlying the web of the first part,
n. a flange issuing from said last named web and engaging the second shoulder of said body means for clamping said webs together.

9. A valve according to claim 8 in which the surfaces of the shoulders and the parts of the flanges engaging the same are in the form of a circle to permit rotating the body about the axis of the aligning branches of the body.